US010203822B2

(12) United States Patent
Wang et al.

(10) Patent No.: US 10,203,822 B2
(45) Date of Patent: Feb. 12, 2019

(54) TOUCH SUBSTRATE AND MANUFACTURING METHOD FOR THE SAME, AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Wenlong Wang, Beijing (CN); Hongqiang Luo, Beijing (CN); Tao Ma, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/325,362

(22) PCT Filed: Mar. 16, 2016

(86) PCT No.: PCT/CN2016/076508
§ 371 (c)(1),
(2) Date: Jan. 10, 2017

(87) PCT Pub. No.: WO2016/169367
PCT Pub. Date: Oct. 27, 2016

(65) Prior Publication Data
US 2017/0199596 A1 Jul. 13, 2017

(30) Foreign Application Priority Data

Apr. 20, 2015 (CN) .......................... 2015 1 0188540

(51) Int. Cl.
*G06F 3/044* (2006.01)
*G02F 1/1333* (2006.01)
(Continued)

(52) U.S. Cl.
CPC ............ *G06F 3/044* (2013.01); *G02F 1/1333* (2013.01); *G02F 1/133512* (2013.01);
(Continued)

(58) Field of Classification Search
CPC . G06F 2203/04103; G06F 2203/04112; G06F 2203/04107; G06F 3/041;
(Continued)

(56) References Cited

U.S. PATENT DOCUMENTS 8,289,457 B2 * 10/2012 Hwang ............... G02F 1/13338
349/12
8,665,226 B2 * 3/2014 Liu .......................... G06F 3/044
345/173
(Continued)

FOREIGN PATENT DOCUMENTS

| CN | 102156600 A | 8/2011 |
| CN | 102819333 A | 12/2012 |

(Continued)

OTHER PUBLICATIONS

China Office Action, Application No. 201510188540.1, dated Apr. 1, 2017, 25 pps.: with English Translation.
(Continued)

*Primary Examiner* — Dismery Mercedes
(74) *Attorney, Agent, or Firm* — Armstrong Teasdale LLP

(57) ABSTRACT

Embodiments of the present disclosure provide a touch substrate and a manufacturing method for the same, and a display device. The touch substrate includes a base, and a white photoresist, a first flat layer, a first metal electrode layer, a second flat layer, and a second metal electrode layer
(Continued)

sequentially formed on the base. The white photoresist is formed in a frame region of the touch substrate. The first flat layer is configured to cover the white photoresist and the base, so as to provide a flat surface for forming the first metal electrode layer. The display device includes the touch substrate and a display panel bonded thereto. In embodiments of the present disclosure, the height difference brought about by the white photoresist is planarized through the first flat layer, thereby avoiding the problem of disconnected wire in a metal electrode layer at the climbing position in the frame region.

9 Claims, 4 Drawing Sheets

(51) Int. Cl.
  *G06F 3/041* (2006.01)
  *G06F 1/16* (2006.01)
  *G02F 1/1335* (2006.01)
  *G06F 3/047* (2006.01)
  *G02F 1/1362* (2006.01)
(52) U.S. Cl.
  CPC .. *G02F 1/136209* (2013.01); *G02F 1/136286* (2013.01); *G06F 3/047* (2013.01); *G02F 2001/133357* (2013.01); *G02F 2001/133388* (2013.01); *G06F 2203/04103* (2013.01); *G06F 2203/04107* (2013.01); *G06F 2203/04112* (2013.01)
(58) Field of Classification Search
  CPC .......... G06F 3/0412; G06F 3/047; G06F 1/16; G06F 1/136209; G02F 2001/133388; G02F 2001/13357; G02F 2001/136295; G02F 1/133345; G02F 1/13338; G02F 1/136286; G02F 1/13439; G02F 1/1333; G02F 1/136209; H01L 27/124; H01L 27/3244; H01L 29/78633
  See application file for complete search history.

(56) References Cited

U.S. PATENT DOCUMENTS

| | | | | |
|---|---|---|---|---|
| 9,081,462 | B2* | 7/2015 | Xie | G06F 3/044 |
| 9,262,022 | B2* | 2/2016 | Lee | G06F 3/044 |
| 9,690,434 | B2* | 6/2017 | Zhang | G06F 3/041 |
| 9,710,117 | B2* | 7/2017 | Ito | G06F 3/041 |
| 10,031,601 | B2* | 7/2018 | Kimura | G06F 3/044 |
| 2011/0316803 | A1* | 12/2011 | Kim | G06F 3/044 345/173 |
| 2012/0033168 | A1* | 2/2012 | Hwang | G02F 1/13338 349/139 |
| 2012/0146921 | A1* | 6/2012 | Park | G06F 3/044 345/173 |
| 2012/0223901 | A1* | 9/2012 | Kim | G06F 3/044 345/173 |
| 2013/0082961 | A1* | 4/2013 | Wang | G06F 3/044 345/173 |
| 2013/0092520 | A1* | 4/2013 | Lee | G06F 3/044 200/600 |
| 2013/0342475 | A1 | 12/2013 | Lee et al. | |
| 2014/0160377 | A1* | 6/2014 | Yamagishi | G06F 3/044 349/12 |
| 2014/0176481 | A1 | 6/2014 | Zhang et al. | |
| 2014/0184941 | A1* | 7/2014 | Lee | G06F 3/041 349/12 |
| 2014/0225843 | A1* | 8/2014 | Kuo | G06F 3/044 345/173 |
| 2014/0293146 | A1* | 10/2014 | Tang | G06F 3/044 349/12 |
| 2014/0340364 | A1* | 11/2014 | Tang | G06F 3/042 345/175 |
| 2015/0169113 | A1* | 6/2015 | Ito | G06F 3/041 345/174 |
| 2015/0185917 | A1* | 7/2015 | Song | G06F 3/044 345/174 |
| 2015/0370395 | A1* | 12/2015 | Hsu | G06F 3/0412 345/174 |
| 2016/0154527 | A1* | 6/2016 | Jiang | G06F 3/041 345/173 |
| 2016/0299611 | A1* | 10/2016 | Park | H01L 51/5237 |

FOREIGN PATENT DOCUMENTS

| | | |
|---|---|---|
| CN | 103383616 A | 11/2013 |
| CN | 103792711 A | 5/2014 |
| CN | 103941912 A | 7/2014 |
| CN | 104765518 A | 7/2015 |
| KR | 2013008743 A | 1/2013 |
| KR | 2013008745 A | 1/2013 |

OTHER PUBLICATIONS

English Translation of PCT (CN) International Search Report, Application No. PCT/CN2016/076508, dated Jun. 17, 2016, 3 pps.
PCT (CN) Written Opinion, Application No. PCT/CN2016/076508, dated Jun. 17, 2016, 6 pps.: with English Translation.

* cited by examiner

TOUCH SUBSTRATE AND MANUFACTURING METHOD FOR THE SAME, AND DISPLAY DEVICE

CROSS REFERENCE TO RELATED APPLICATIONS

This application is a National Stage Entry of PCT/CN2016/076508 filed Mar. 16, 2016, which claims the benefit and priority of Chinese Patent Application No. 201510188540.1, filed on Apr. 20, 2015, of which are incorporated by reference herein in their entirety as part of the present application.

BACKGROUND

The present disclosure relates to the technical field of preparing a touch substrate, and particularly, to a touch substrate and a manufacturing method for the same, and a display device.

Currently, the capacitive touch screen is widely used in mobile phones, tablets and other fields. A conventional capacitive touch screen uses a Glass-Glass (GG) structure, that is, a structure bonding a layer of cover glass and a layer of touch glass. With the user's increasingly high demand for a light, thin and low-cost touch screen, the capacitive touch screen of the GG structure has been unable to meet user's needs. Glass-Film (GF), Glass-Film-Film (GFF), One Glass Solution (OGS) touch structures and the like are gradually being used.

Currently on the market the touch screen of the OGS structure compared to the GG, GF, GFF structure has encountered difficulty in the appearance. Conventional GG, GF, GFF structures use black ink or white ink as the frame material for the cover of the touch screen, and touch screens with a black frame and touch screens with a white frame may be produced. The OGS structure typically uses a photoresist material as the frame material. However, the white photoresist material technology on the market is not yet mature. If the glass cover using the white photoresist material wants to achieve the same optical effect as the cover using the white ink material, the thickness of the white photoresist material should be at least 15 um or more. And a layer of material with high light absorption coefficient should be additionally arranged above the white photoresist material to ensure the required optical density (OD value). Thus, the surface for forming the electrode layer is not flat and different positions on the surface have an excessive height difference therebetween, resulting in that in the frame region of the touch screen, the wiring in the electrode layer (made of ITO or metal) is disconnected at the climbing position so that the touch function is disabled.

BRIEF DESCRIPTION

Embodiments of the present disclosure provide a touch substrate and a manufacturing method for the same, and a display device, which avoid the problem that a wiring in a metal electrode layer is disconnected at the climbing position in the frame region, by planarizing the height difference brought about by white photoresist through the first flat layer.

According to a first aspect, embodiments of the present disclosure provide a touch substrate including a base, and a white photoresist, a first flat layer, a first metal electrode layer, a second flat layer, and a second metal electrode layer sequentially formed on the base. Wherein the white photoresist is formed in a frame region of the touch substrate. The first flat layer is configured to cover the white photoresist and the base to provide a flat surface for forming the first metal electrode layer.

In embodiments of the present disclosure, the first metal electrode layer includes a plurality of first metal electrode lines, the second metal electrode layer includes a plurality of second metal electrode lines, and the plurality of first metal electrode lines and the plurality of second metal electrode lines are crossed.

In embodiments of the present disclosure, the first metal electrode layer includes a first wiring region in the frame region perpendicular to an extending direction of the first metal electrode lines, and the first metal electrode lines are connected to the first wiring region.

In embodiments of the present disclosure, the second metal electrode layer includes a second wiring region in the frame region perpendicular to an extending direction of the second metal electrode lines, and the second metal electrode lines are connected to the second wiring region.

In embodiments of the present disclosure, the first metal electrode layer includes a first light-shield region in the frame region parallel to an extending direction of the first metal electrode lines.

In embodiments of the present disclosure, the second metal electrode layer includes a second light-shield region in the frame region parallel to an extending direction of the second metal electrode lines.

In embodiments of the present disclosure, the first metal electrode layer is black.

In embodiments of the present disclosure, the second metal electrode layer is black.

In embodiments of the present disclosure, the first flat layer and the second flat layer are formed of a transparent insulating material.

According to a second aspect, embodiments of the present disclosure provide a manufacturing method for a touch substrate including forming a base, and forming a white photoresist, a first flat layer, a first metal electrode layer, a second flat layer, and a second metal electrode layer on the base sequentially. The white photoresist is formed in a frame region of the touch substrate. The first flat layer is configured to cover the white photoresist and the base to provide a flat surface for forming the first metal electrode layer.

In embodiments of the present disclosure, the method further includes forming a plurality of first metal electrode lines in the first metal electrode layer, and forming a plurality of second metal electrode lines in the second metal electrode layer, the plurality of first metal electrode lines and the plurality of second metal electrode lines are crossed.

In embodiments of the present disclosure, the method further includes forming, in the first metal electrode layer, a first wiring region in the frame region perpendicular to an extending direction of the first metal electrode lines, and connecting the first metal electrode lines to the first wiring region.

In embodiments of the present disclosure, the method further includes forming, in the second metal electrode layer, a second wiring region in the frame region perpendicular to an extending direction of the second metal electrode lines, and connecting the second metal electrode lines to the second wiring region.

In embodiments of the present disclosure, the method further includes forming, in the first metal electrode layer, a first light-shield region in the frame region parallel to an extending direction of the first metal electrode lines.

In embodiments of the present disclosure, the method further includes forming, in the second metal electrode layer, a second light-shield region in the frame region parallel to an extending direction of the second metal electrode lines.

In embodiments of the present disclosure, the first metal electrode layer is black.

In embodiments of the present disclosure, the second metal electrode layer is black.

In embodiments of the present disclosure, the first flat layer and the second flat layer are formed using a transparent insulating material.

According to a third aspect, embodiments of the present disclosure provide a display device including the above-described touch substrate and a display panel bonded to the touch substrate.

It can be seen from the technical solution abovementioned that the embodiments of the present disclosure provide a touch substrate and a manufacturing method for the same, and a display device, which avoid the problem that the wiring in the metal electrode layer is disconnected at the climbing position in the frame region, by arranging the first flat layer between the white photoresist and the first metal electrode layer to planarize the height difference brought about by the white photoresist.

BRIEF DESCRIPTION OF THE DRAWINGS

In order to more clearly illustrate the embodiments of the present disclosure, the drawings required to be used in the embodiments will be briefly described below. It is apparent that the drawings in the following description are merely of some embodiments of the present disclosure. Those skilled in the art may also obtain other drawings from these drawings without inventive efforts.

DETAILED DESCRIPTION

The technical solutions in the embodiments of the present disclosure will be clearly and comprehensively described below in combination with the accompanying drawings. Obviously, the embodiments described are merely part of the embodiments of the present disclosure but are not all of the embodiments. All other embodiments obtained by those skilled in the art based on the embodiments in the present disclosure without creative efforts are within the scope of the protection of the present disclosure.

Figure 1:
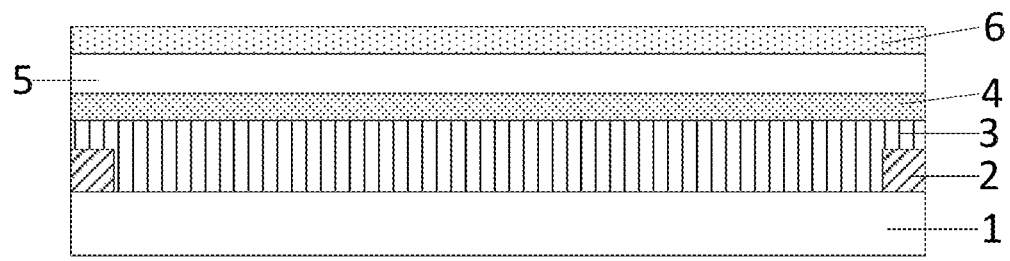
FIG. 1 is a schematic diagram of a layer structure of a touch substrate according to some embodiments of the present disclosure or in at least one embodiment.

FIG. 1 is a schematic diagram of a layer structure of a touch substrate according to some embodiments of the present disclosure or in at least one embodiment. Some embodiments or at least one embodiment of the present disclosure provide a touch substrate. As shown in FIG. 1, the touch substrate includes a base 1, a white photoresist 2, a flat layer 3, a first metal electrode layer 4, a second flat layer 5, and a second metal electrode layer 6 sequentially formed on the base 1. The white photoresist 2 is formed in the frame region of the touch substrate, and the first flat layer 3 is configured to cover the white photoresist and the base to provide a flat surface for forming the first metal electrode layer.

Thus, the first flat layer 3 may fill the space between the first metal electrode layer 4 and the base 1 besides the white photoresist 2. By planarizing the height difference brought about by the white photoresist 2 through the first flat layer 3, the line-broken problem which occurs when the metal electrode layer climbs in the frame region is avoided.

Figure 2:
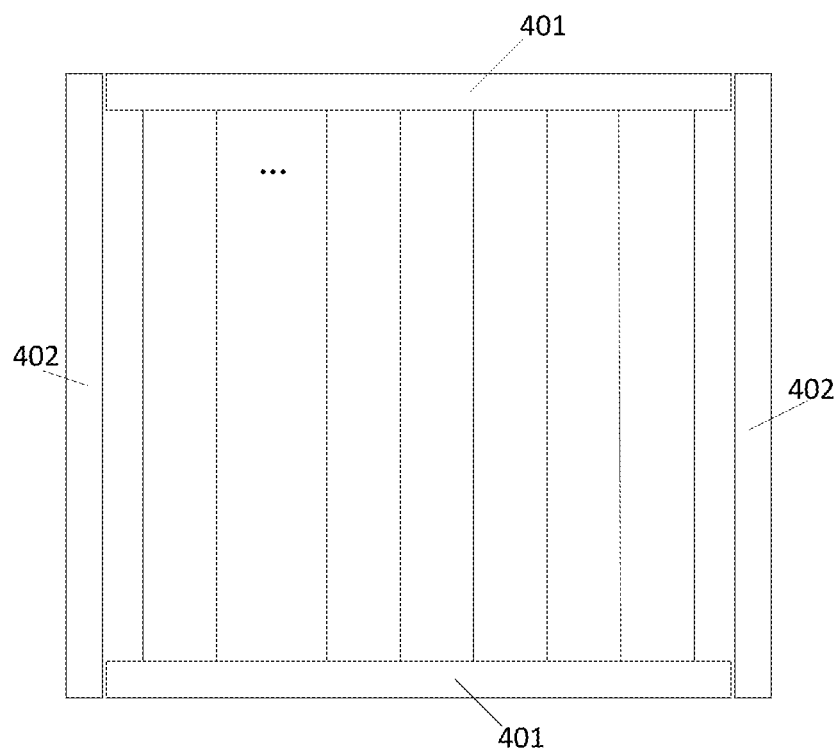
FIG. 2 is a schematic diagram of a first metal electrode layer of the touch substrate shown in FIG. 1.
Figure 3:
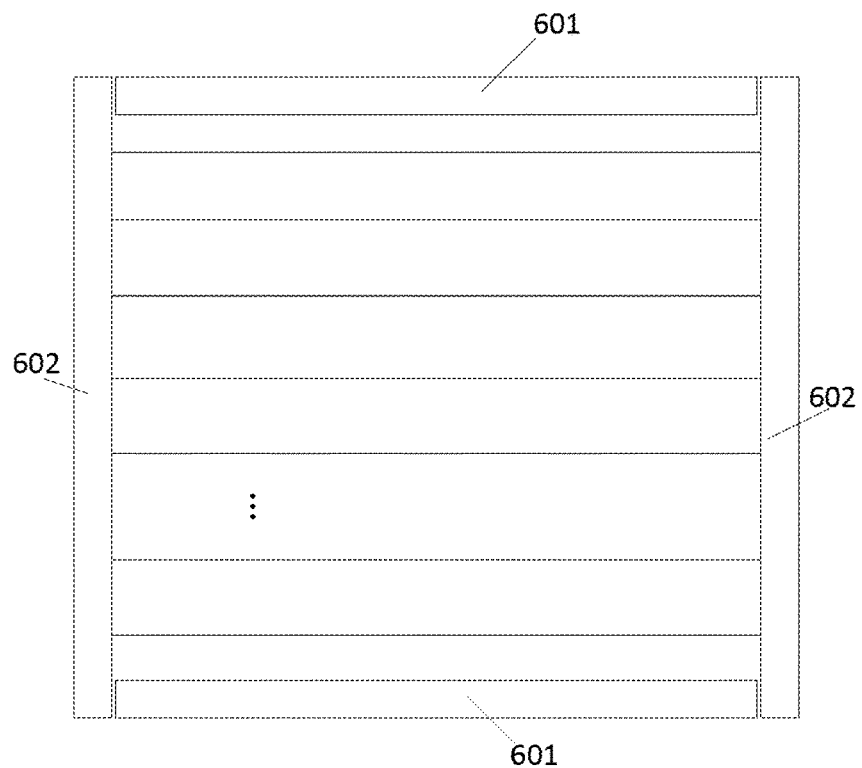
FIG. 3 is a schematic diagram of a second metal electrode layer of the touch substrate shown in FIG. 1.
Figure 4:
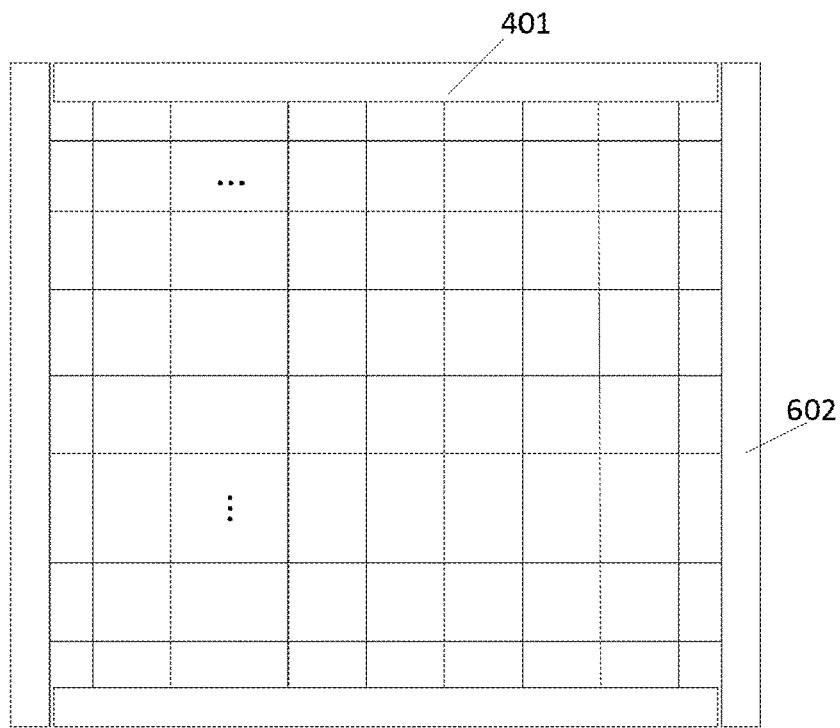
FIG. 4 is a schematic diagram of a metal mesh structure composed of the first metal electrode layer and the second metal electrode layer of the touch substrate shown in FIG. 1.

FIG. 2 is a schematic diagram of the first metal electrode layer of the touch substrate shown in FIG. 1. FIG. 3 is a schematic diagram of the second metal electrode layer of the touch substrate shown in FIG. 1. FIG. 4 is a schematic diagram of a metal mesh structure composed of the first metal electrode layer and the second metal electrode layer of the touch substrate shown in FIG. 1.

In embodiments of the present disclosure, as shown in FIG. 2, the first metal electrode layer 4 includes a plurality of first metal electrode lines. As shown in FIG. 3, the second metal electrode layer 6 includes a plurality of second metal electrode lines, and the plurality of first metal electrode lines and the plurality of second metal electrode lines are crossed. As shown in FIG. 4, the plurality of metal electrode lines of the first metal electrode layer 4 and the plurality of metal electrode lines of the second metal layer 6 form a metal mesh structure. This metal mesh structure design not only reduces the operation processes, but also increases the mechanical performance of the touch substrate, and is more suitable for a large-size touch screen.

In embodiments of the present disclosure, in the metal mesh structure composed of the first metal electrode layer 4 and the second metal electrode layer 6, the size of each metal mesh may be equal to the size of each pixel unit, or the size of each metal mesh may be an integer multiple of the size of each pixel unit. Thus, this metal mesh structure can effectively eliminate moire effect.

In embodiments of the present disclosure, as shown in FIG. 2, the first metal electrode layer 4 includes a first wiring region 401 in the frame region perpendicular to an extending direction of the first metal electrode lines, and the first metal electrode lines are connected to the first wiring region 401. As shown in FIG. 3, the second metal electrode layer 6 includes a second wiring region 602 in the frame region perpendicular to an extending direction of the second metal electrode lines, and the second metal electrode lines are connected to the second wiring region 602.

In this manner, the plurality of first metal electrode lines are collected in the first wiring region 401 and connected to an external circuit through the first wiring region 401. The plurality of second metal electrode lines are collected in the second wiring region 602 and connected to an external circuit through the second wiring region 602.

In embodiments of the present disclosure, as shown in FIG. 2, the first metal electrode layer 4 includes a first light-shield region 402 in the frame region parallel to an extending direction of the first metal electrode lines. As shown in FIG. 3, the second metal electrode layer 6 includes a second light-shield region 601 in the frame region parallel to an extending direction of the second metal electrode lines. By arranging the light-shield regions on the first metal electrode layer and the second metal electrode layer, the light-shield effect of the frame is enhanced.

In embodiments of the present disclosure, the first metal electrode layer 4 is black. The second metal electrode layer 6 is black. That is, the black first metal electrode layer 4 and/or the black second metal electrode layer 6 are provided on the white photoresist 2. The black metal electrode layer has a high light absorption coefficient so that the optical density of the white photoresist 2 is ensured. It is to be understood that in the metal electrode layers, no metal electrode lines or metal electrode lines which are thin enough may be arranged in the display region of the touch substrate, so that even if black metal electrode lines are used, the metal electrode layers in the display region may have good light transmittance. In addition, in the metal electrode layers, black metal electrode lines or other structure which are thick enough may be provided in the frame region of the touch substrate to ensure the optical density of the white photoresist 2.

In embodiments of the present disclosure, the first flat layer 3 and the second flat layer 5 are each formed of a transparent insulating material. Wherein the second flat layer 5 is located between the first metal electrode layer 4 and the second metal electrode layer 6 for insulating the first metal electrode layer 4 and the second metal electrode layer 6. The second flat layer 5 may also provide a flat surface for forming the second metal electrode layer 6.

Some embodiments or at least one embodiment of the present disclosure provide a manufacturing method for a touch substrate including forming a base, and forming a white photoresist, a first flat layer, a first metal electrode layer, a second flat layer, and a second metal electrode layer on the base sequentially. Wherein the white photoresist is formed in a frame region of the touch substrate and the first flat layer is configured to cover the white photoresist and the base to provide a flat surface for forming the first metal electrode layer.

In this manner, the first flat layer may fill the space between the first metal electrode layer and the base besides the white photoresist. By planarizing the height difference brought about by the white photoresist through the first flat layer, the line-broken problem which occurs when the metal electrode layer climbs in the frame region is avoided.

In embodiments of the present disclosure, the method further includes arranging a plurality of first metal electrode lines in the first metal electrode layer, and arranging a plurality of second metal electrode lines in the second metal electrode layer, the plurality of first metal electrode lines and the plurality of second metal electrode lines are crossed. The plurality of first metal electrode lines and the plurality of second metal electrode lines crossed form a metal mesh structure. This metal mesh structure design not only reduces the operation processes, but also increases the mechanical performance of the touch substrate, and is more suitable for the production of a large-size touch screen.

In embodiments of the present disclosure, in the metal mesh structure composed of the first metal electrode layer 4 and the second metal electrode layer 6, the size of each metal mesh may be equal to the size of each pixel unit, or the size of each metal mesh may be an integer multiple of the size of each pixel unit. Thus, this metal mesh structure can effectively eliminate moire effect.

In embodiments of the present disclosure, the method further includes forming, in the first metal electrode layer, a first wiring region in the frame region perpendicular to an extending direction of the first metal electrode lines, and connecting the first metal electrode lines to the first wiring region.

In embodiments of the present disclosure, the method further includes forming, in the second metal electrode layer, a second wiring region in the frame region perpendicular to an extending direction of the second metal electrode lines, and connecting the second metal electrode lines to the second wiring region.

In embodiments of the present disclosure, the method further includes forming, in the first metal electrode layer, a first light-shield region in the frame region parallel to an extending direction of the first metal electrode lines.

In embodiments of the present disclosure, the method further includes forming, in the second metal electrode layer, a second light-shield region in the frame region parallel to an extending direction of the second metal electrode lines.

In embodiments of the present disclosure, the first metal electrode layer is black.

In embodiments of the present disclosure, the second metal electrode layer is black.

The first metal electrode layer and the second metal electrode layer have a high light absorption coefficient so as to ensure the optical density of the white photoresist under the first metal electrode layer and the second metal electrode layer.

In embodiments of the present disclosure, the first flat layer and the second flat layer are formed using a transparent insulating material.

Some embodiments or at least one embodiment of the present disclosure provide a display device including the above-described touch substrate and a display panel bonded to the touch substrate. The display device may be any device having a display function such as a television, a display panel, a display, a tablet computer, a mobile phone, a navigator, a camera, or a video camera.

In order to more clearly illustrate the technical solution of the present disclosure, some embodiments or at least one embodiment of the present disclosure will be described below in conjunction with a flowchart including manufacturing steps and a schematic cross-sectional diagram of a layer structure formed in various manufacturing steps. It is to be understood that the structure shown herein is illustrative and there may also be other structural forms according to the scope and spirit of the present disclosure as defined by the claims of the present disclosure.

Figure 5:
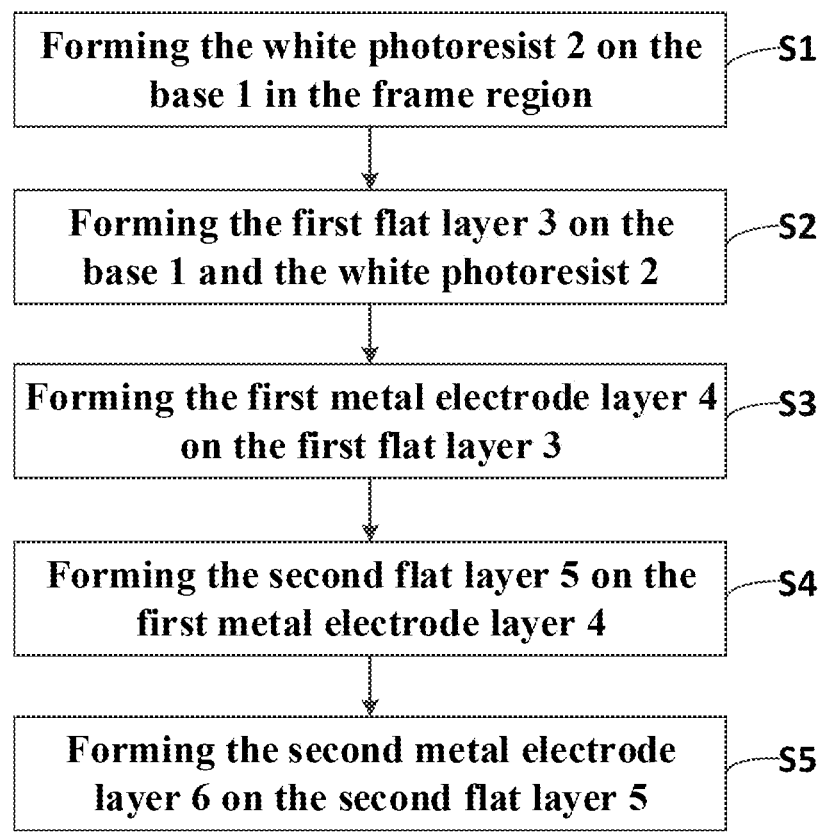
FIG. 5 is a schematic flow chart of a manufacturing method for the touch substrate shown in FIG. 1 according to some embodiments of the present disclosure or at least one embodiment.
Figure 6:
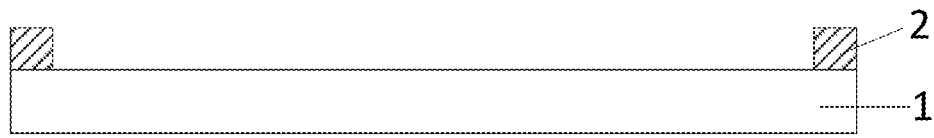
FIG. 6 is a schematic diagram of the structure of the touch substrate shown in FIG. 1 after a white photoresist is formed on a base.
Figure 7:
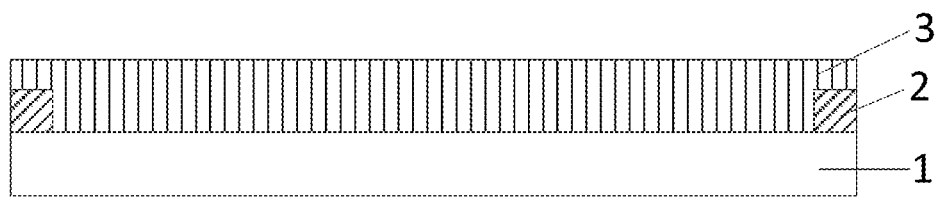
FIG. 7 is a schematic diagram of the structure of the touch panel shown in FIG. 1 after a first flat layer is formed.
Figure 8:
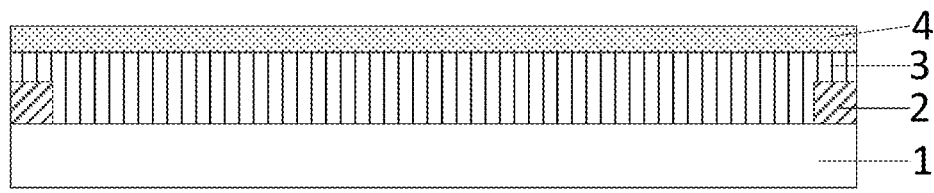
FIG. 8 is a schematic diagram of the structure of the touch substrate shown in FIG. 1 after the first metal electrode layer is formed.
Figure 9:
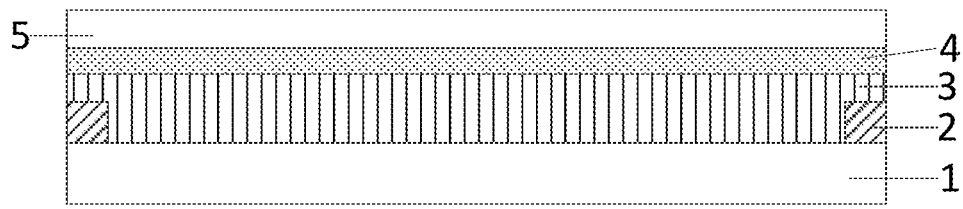
FIG. 9 is a schematic diagram of the structure of the touch substrate shown in FIG. 1 after the second flat layer is formed.

FIG. 5 is a schematic flow chart of a manufacturing method for the touch substrate shown in FIG. 1 according to some embodiments or at least one embodiment of the present disclosure. FIG. 6 is a schematic diagram of the structure of the touch substrate shown in FIG. 1 after the white photoresist is formed on the base. FIG. 7 is a schematic diagram of the structure of the touch panel shown in FIG. 1 after the first flat layer is formed. FIG. 8 is a schematic diagram of the structure of the touch substrate shown in FIG. 1 after the first metal electrode layer is formed. FIG. 9 is a schematic diagram of the structure of the touch substrate shown in FIG. 1 after the second flat layer is formed.

As shown in FIG. 5, the manufacturing method may specifically include the following steps. S1: the white photoresist 2 is formed in the frame region of the base 1, and the structure is shown in FIG. 6. The base 1 may be formed of a material such as reinforced glass. S2: the first flat layer 3 is formed on the base 1 and the white photoresist 2, and the structure is shown in FIG. 7. The height of the first flat layer 3 is greater than or equal to the height of the white photoresist 2 to planarize the height difference between the white photoresist 2 and the base 1. The material of the first flat layer 3 is a transparent insulating material. S3: the first metal electrode layer 4 is formed on the first flat layer 3, and the structure is shown in FIG. 8. The first metal electrode layer 4 may be formed of a black material having a high light absorption coefficient, so that the optical density of the white photoresist 2 is ensured. S4: the second flat layer 5 is formed on the first metal electrode layer 4, and the structure is shown in FIG. 9. The second flat layer 2 is a transparent insulating material to insulate the first metal electrode layer 4 and the second metal electrode layer 6. S5: the second metal electrode layer 6 is formed on the second flat layer 5, and the structure is shown in FIG. 1.

A plurality of first metal electrode lines are formed in the first metal electrode layer 4, a plurality of second metal electrode lines are formed in the second metal electrode layer 6, and the plurality of first metal electrode lines and the plurality of second metal electrode lines are crossed. The plurality of first metal electrode lines and the plurality of second metal electrode lines crossed form a metal mesh structure, which not only reduces the operation processes, but also increases the mechanical performance of the touch substrate, and is more suitable for the production of a large-size touch screen.

The above embodiments are merely illustrative of the technical solutions of the present disclosure and are not to be construed as limitations thereof While the present disclosure has been described in detail with reference to the foregoing embodiments, it will be understood by those skilled in the art that the technical solutions disclosed in the foregoing embodiments can also be modified or some of the technical features thereof may be equivalently substituted, and these modifications and substitutions do not make the essence of the technical solutions depart from the spirit and scope of the technical solutions of the embodiments of the present disclosure.

What is claimed is:

1. A touch substrate comprising:
   a base; and
   a white photoresist, a first flat layer, a first metal electrode layer, a second flat layer, and a second metal electrode layer sequentially formed on the base, wherein the white photoresist is formed in a frame region of the touch substrate, and wherein the first flat layer is configured to cover the white photoresist and the base to provide a flat surface for forming the first metal electrode layer;
   wherein the first metal electrode layer comprises a plurality of first metal electrode lines, wherein the second metal electrode layer comprises a plurality of second metal electrode lines, and wherein the plurality of first metal electrode lines and the plurality of second metal electrode lines are crossed;
   wherein the first metal electrode layer comprises a first light-shield region in the frame region parallel to an extending direction of the first metal electrode lines;
   wherein the second metal electrode layer comprises a second light-shield region in the frame region parallel to an extending direction of the second metal electrode lines;
   wherein the first metal electrode layer comprises a first wiring region in the frame region perpendicular to an extending direction of the first metal electrode lines, and wherein the first metal electrode lines are connected to the first wiring region;
   wherein the second metal electrode layer comprises a second wiring region in the frame region perpendicular to an extending direction of the second metal electrode lines, and wherein the second metal electrode lines are connected to the second wiring region;
   wherein the first wiring region is provided at two ends of the first metal electrode lines, and the first light-shield region is provided at two sides of the first metal electrode lines; and
   wherein the second wiring region is provided at two ends of the second metal electrode lines, and the second light-shield region is provided at two sides of the second metal electrode lines.

2. The touch substrate according to claim 1, wherein the first metal electrode layer is black.

3. The touch substrate according to claim 1, wherein the second metal electrode layer is black.

4. The touch substrate according to claim 1, wherein the first flat layer and the second flat layer are formed of a transparent insulating material.

5. A display device comprising the touch substrate according to claim 1 and a display panel bonded to the touch substrate.

6. A manufacturing method for a touch substrate comprising:
   forming a base;
   forming a white photoresist, a first flat layer, a first metal electrode layer, a second flat layer, and a second metal electrode layer on the base sequentially, wherein the white photoresist is formed in a frame region of the touch substrate, and wherein the first flat layer is configured to cover the white photoresist and the base to provide a flat surface for forming the first metal electrode layer;
   forming a plurality of first metal electrode lines in the first metal electrode layer;
   forming a plurality of second metal electrode lines in the second metal electrode layer, wherein the plurality of first metal electrode lines and the plurality of second metal electrode lines are crossed;
   forming, in the first metal electrode layer, a first light-shield region in the frame region parallel to an extending direction of the first metal electrode lines;
   forming, in the second metal electrode layer, a second light-shield region in the frame region parallel to an extending direction of the second metal electrode lines;
   forming, in the first metal electrode layer, a first wiring region in the frame region perpendicular to an extending direction of the first metal electrode lines; and
   connecting the first metal electrode lines to the first wiring region;
   forming, in the second metal electrode layer, a second wiring region in the frame region perpendicular to an extending direction of the second metal electrode lines; and
   connecting the second metal electrode lines to the second wiring region;
   wherein the first wiring region is provided at two ends of the first metal electrode lines, and the first light-shield region is provided at two sides of the first metal electrode lines; and wherein the second wiring region is provided at two ends of the second metal electrode lines, and the second light-shield region is provided at two sides of the second metal electrode lines.

7. The method according to claim 6, wherein the first metal electrode layer is black.

8. The method according to claim 6, wherein the second metal electrode layer is black.

9. The method according to claim 6, wherein the first flat layer and the second flat layer are formed of a transparent insulating material.

* * * * *